United States Patent
Reis et al.

(10) Patent No.: US 10,164,723 B2
(45) Date of Patent: Dec. 25, 2018

(54) ADAPTIVE AUGMENTED REALITY SATELLITE ACQUISITION

(71) Applicant: Higher Ground LLC, Palo Alto, CA (US)

(72) Inventors: Robert S. Reis, Palo Alto, CA (US); Shmuel Shaffer, Palo Alto, CA (US); Bruce L. McKinley, South Riding, VA (US)

(73) Assignee: Higher Ground LLC, Palo Alto, CA (US)

( * ) Notice: Subject to any disclaimer, the term of this patent is extended or adjusted under 35 U.S.C. 154(b) by 0 days.

(21) Appl. No.: 15/461,854

(22) Filed: Mar. 17, 2017

(65) Prior Publication Data

US 2018/0270000 A1     Sep. 20, 2018

(51) Int. Cl.
*H04B 7/185* (2006.01)
*H04B 17/40* (2015.01)
*G06T 11/60* (2006.01)

(52) U.S. Cl.
CPC .............. *H04B 17/40* (2015.01); *G06T 11/60* (2013.01); *H04B 7/18517* (2013.01); *H04B 7/18582* (2013.01)

(58) Field of Classification Search
CPC . H04B 7/18517; H04B 7/185; H04B 7/18539
USPC ...................................... 455/12.1, 13.1, 427
See application file for complete search history.

(56) References Cited

U.S. PATENT DOCUMENTS

| | | | |
|---|---|---|---|
| 9,893,799 B2* | 2/2018 | Reis ................... | H04B 7/18517 |
| 2015/0349417 A1* | 12/2015 | Richards ................ | H01Q 3/08 |
| | | | 342/352 |
| 2016/0374047 A1 | 12/2016 | Reis | |

OTHER PUBLICATIONS

Satellite AR—Android Apps on Google Play, downloaded from web page: https://play.google.com/store/apps/details?id=com.agi.android.augmentedreality&hl=en, Download date: Oct. 20, 2017, original posting date: unknown, 3 pages.
Augmented Reality App—the Next Generation Satellite Finder, Dish Pointer, downloaded from web page: http://www.dishpointer.com/2009/augmented-reality-satellite-finder/, Download Date: Oct. 20, 2017, original posting date: unknown, 19 pages.

* cited by examiner

*Primary Examiner* — Philip Sobutka
(74) *Attorney, Agent, or Firm* — Panitch Schwarze Belisario & Nadel LLP

(57) ABSTRACT

Satellite acquisition, for enabling a user device to engage in satellite communications, may be implemented using augmented reality (AR). An AR display may be presented to a user, and the user may use the AR display to point the user device toward a desired satellite. The process may include offsetting the position of a satellite icon representing the desired satellite in the AR display if acquisition is unsuccessful and thus indicating that the user device should be pointed to the offset position. In the case of a non-geosynchronous earth-orbit (non-GEO) satellite, such as a low-earth-orbit (LEO) satellite, the position of the satellite icon representing such a non-GEO satellite may be compensated for satellite movement during a satellite acquisition attempt.

20 Claims, 19 Drawing Sheets

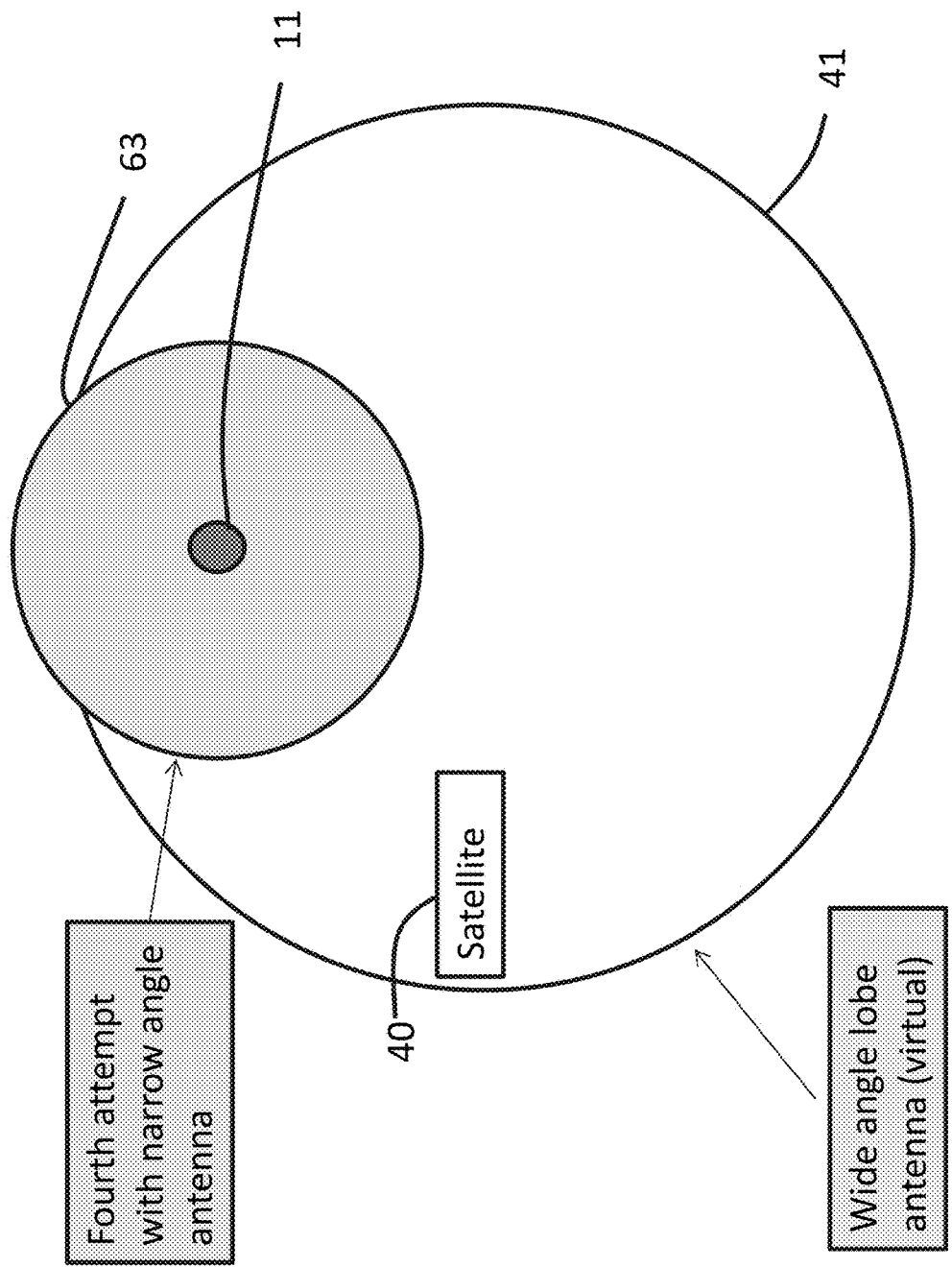

ADAPTIVE AUGMENTED REALITY SATELLITE ACQUISITION

FIELD

Various aspects of this disclosure may relate to systems and methods using adaptive augmented reality (AR) to assist in pointing an antenna/device in order to acquire (i.e., locate, e.g., by detecting a signal and, in some cases, establishing a communication link) a communications satellite.

BACKGROUND

Geosynchronous Earth Orbiting (GEO) and/or Low Earth Orbiting (LEO) satellites are often deployed in satellite constellations. LEO satellites may have coverage areas that only covers a small area on the ground at a given time. The area covered moves as the satellite travels at a high angular velocity. A high angular velocity is needed in order to maintain the LEO satellite in orbit. Many LEO satellites are needed to maintain continuous coverage over an area. LEO satellites contrast with GEO satellites, where a single GEO satellite, moving at the same angular velocity as the rotation of the earth's surface, may provide permanent coverage over a large area.

Examples of satellite constellations include the Global Positioning System (GPS), Galileo and GLONASS constellations for navigation and geodesy; the Iridium and Globalstar satellites for telephony services; the Disaster Monitoring Constellation and RapidEye for remote sensing; the Orbcomm satellites for messaging service; the Russian elliptic orbit Molniya and Tundra constellations; and the Cospas-Sarsat search and rescue satellites.

Broadband applications may benefit from low-latency communications, so LEO satellite constellations provide an advantage over a geostationary satellite. The minimum theoretical latency for a GEO satellite is about 250 milliseconds, compared to only a few milliseconds for a LEO satellite. A LEO satellite constellation can also provide more system capacity by frequency reuse across its coverage, with spot beam frequency use being analogous to the frequency reuse of cellular base station radio towers. However, LEO satellites suffer from a scan problem. When a user wishes to initiate communication, it may be minutes or hours before a LEO satellite is above the horizon and can begin a communication session. Similar issues face other types of non-GEO satellites.

The U.S. Federal Communications Commission (FCC) requires that communication over a GEO satellite should operate at a low power density. Consequently, a satellite signal received at an arbitrary point on the ground, with an antenna pointing in an arbitrary direction, may typically be weak and may not be distinguishable from noise. Downlink signals from LEO or other non-GEO satellites suffer from similar power density limitations and may also need directional precision in acquiring their signals at ground-based stations.

Hence, to receive signals or messages from a satellite, a receiver must generally know the approximate location of a satellite and point its antenna in the direction of the satellite. By so doing, the receiver may then be able to receive a downlink signal (i.e., from satellite to ground), which may then be processed and may be successfully demodulated.

As described above, the process of detecting a satellite signal starts with knowing the approximate exact location of the satellite in the sky and pointing the antenna of the receiver towards the satellite. Applications such as Satellite AR by Analytical Graphics, Inc. (play.google.com/store/apps/details?id=com.agi.android.augmentedreality&hl=en), DishPointer Augmented Reality (www.dishpointer.com/2009/augmented-reality-satellite-finder), and others may facilitate pointing a hand held device such as, e.g., a mobile phone, tablet computer, or a Higher Ground LLC SatPaq™ mobile unit, to point towards a specific GEO satellite. Such applications are generally limited to GEO satellite uses because the position of a GEO satellite is known, based on its geosynchronous orbit.

Existing applications rely on sensors such as a compass, tilt sensors, etc. to direct the user of the augmented reality to point the device towards a specific satellite. These sensors can be either built in the device such as sensors built in a mobile phone, or external sensors that are attached or otherwise associated with the AR device. In either case, these sensors may have limited accuracy that may decrease the precision with which the device is able to be pointed at the intended satellite. This, in turn, may result in a decrease in power of the received signal from the satellite and, in general, reduce the ability of the device to acquire a satellite.

SUMMARY OF ASPECTS OF THE DISCLOSURE

Various aspects of this disclosure may address the issues of pointing a device, e.g., a handheld device, such as a smartphone, SatPaq™ mobile unit or tablet computer, toward a desired satellite, in order to overcome the above-noted problems. These issues may be addressed by means of adaptive AR-based techniques. Such techniques may be implemented the form of hardware, software, or firmware, or combinations thereof. In the case of a software-based implementation, machine-executable instructions may be stored on a non-transitory computer-readable medium, which instructions may be executable by one or more processing devices (e.g., general-purpose central processing units (CPUs), graphics processing units (GPUs), etc.).

BRIEF DESCRIPTION OF THE DRAWINGS

Various aspects of the present disclosure will now be described in conjunction with the accompanying drawings, in which:

FIGS. 6A-6G show various line-of-sight conceptual views from a device, according to various aspects of the present disclosure;

DETAILED DESCRIPTION OF ASPECTS OF THE DISCLOSURE

Figure 1:
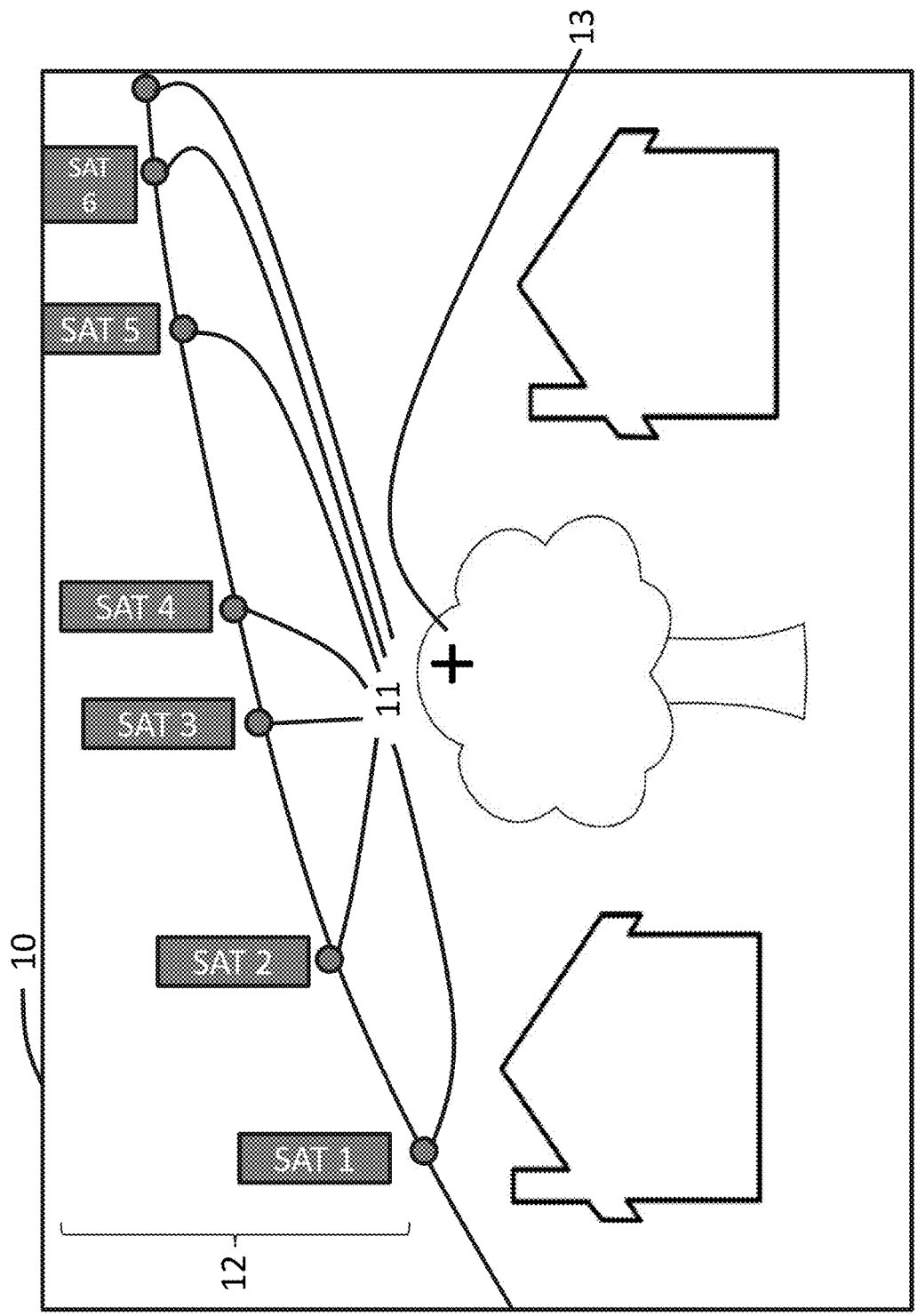
FIG. 1 shows a conceptual diagram of an AR display according to various aspects of the present disclosure.
Figure 2:
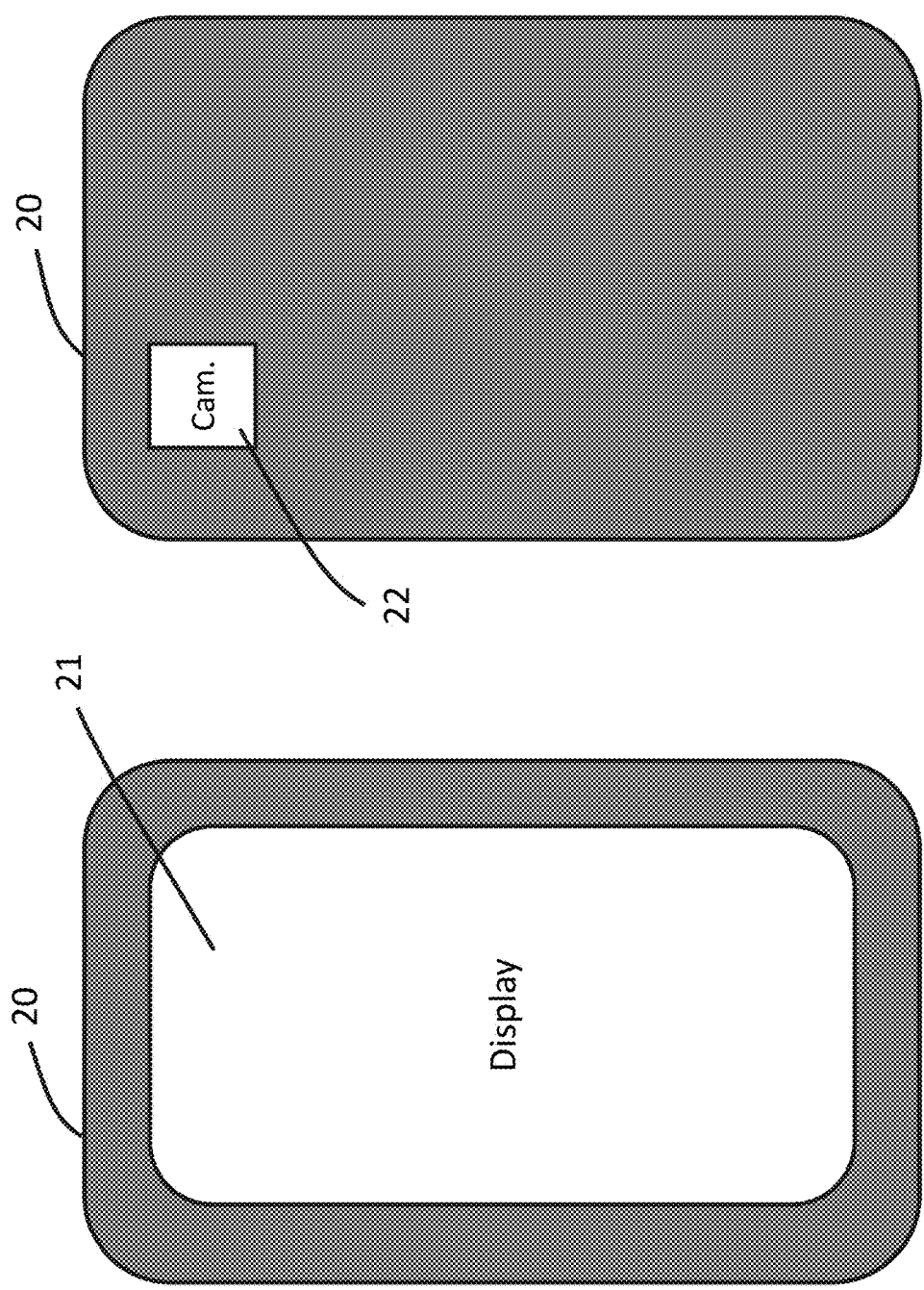
FIGS. 2A and 2B show examples of a device that may incorporate various aspects of the present disclosure.

As discussed above, AR applications presently exist for assisting a user in pointing a device toward a satellite. As shown in FIG. 1, such an application may operate on a device 20, as shown in FIGS. 2A and 2B, to provide a visual display that may assist the user. Device 20 may be, for example, a smartphone or a tablet computer, or other handheld or non-handheld device. The AR application may utilize the camera 22 of the device 20 to obtain an image, which may be presented on the display 21 of the device. The displayed image from the camera may be used to ensure that the line of sight toward a particular satellite is not obscured by obstacles such as homes, trees, mountains, etc. As shown in FIG. 1, the displayed image 10 may be augmented with points or other types of icons 11 (to be referred to hereinafter as "satellite icons") that may represent various satellites, e.g., GEO satellites. The satellite icons may have labels 12 to indicate which satellites are represented on the display. The AR application may determine the positions in which to display satellite icons 11 based on a pre-stored table of satellite position information, for example, in combination with other data (e.g., location as may be determined using a GPS receiver of the device). Alternatively or additionally, the AR application may obtain satellite position information from a remote source, e.g., on an as-needed basis. The positions 11 of the satellite icons may vary according to a direction in which the device 20 is pointing and may also move when the device 20 is moved or is pointed in a different direction. Finally, the AR application may provide a crosshair 13 or other icon (hereinafter to be referred to as the "device icon") to indicate a direction in which the device 20 (and/or its antenna) is presently pointing. As such, a user may move device 20 so as to try to align the device icon 13 with a desired satellite icon 11.

Figure 3:
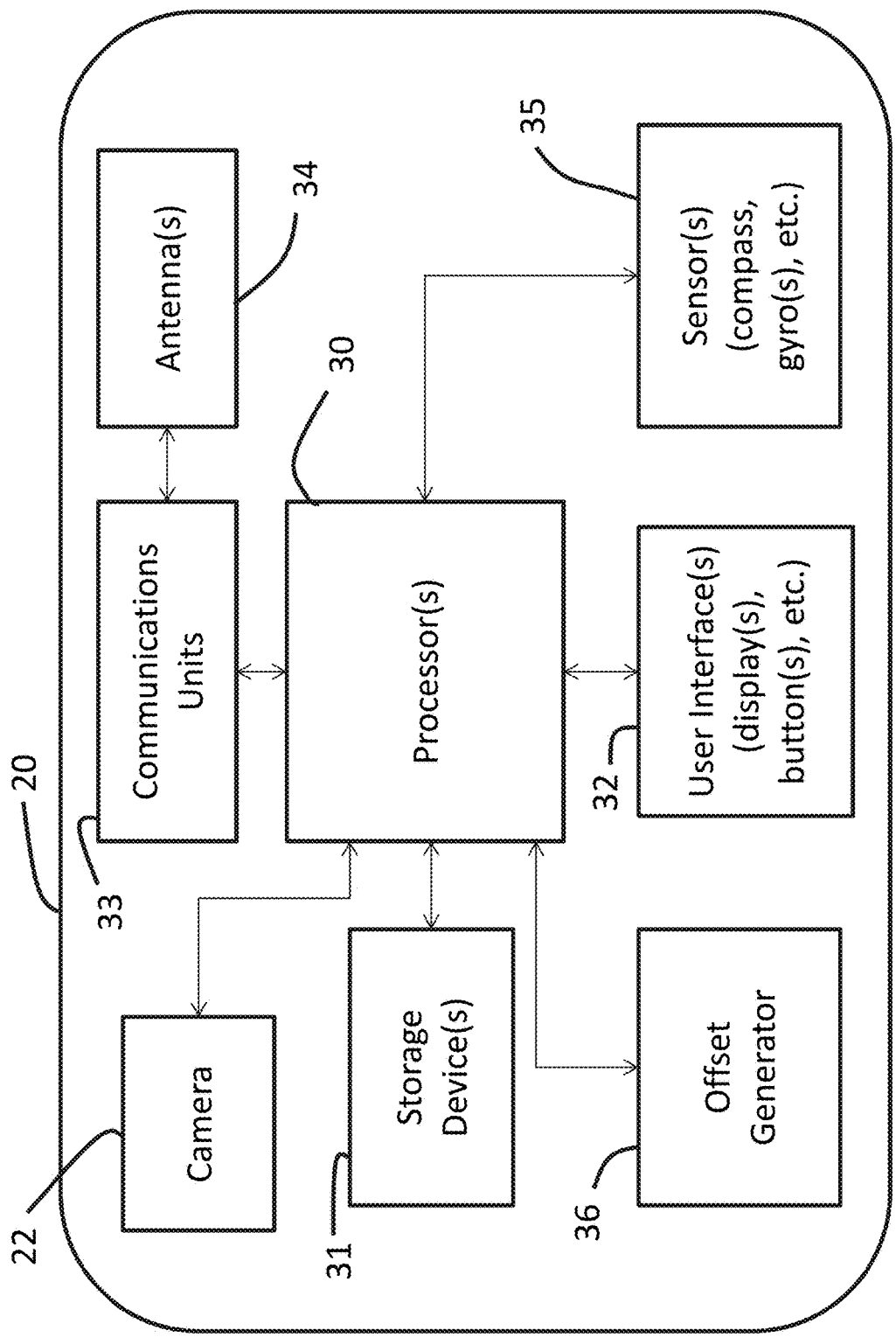
FIG. 3 shows a conceptual block diagram of an example of a device that may incorporate various aspects of the present disclosure.

FIG. 3 shows in further detail an example of device 20 that may incorporate various aspects of the present disclosure. A device 20 may include one or more processors 30, which may be used to implement and/or control various techniques described above and to be described below. Processor(s) 30 may be communicatively coupled to one or more storage devices 31, such as memories of one or more types (read-only memory (ROM), random-access memory (RAM), flash memory, cache memory, optical or magnetic disk memory, etc.). Storage device(s) 31 may store system-level software (e.g., an operating system), as well as application software (e.g., to run one or more applications). The software may be in the form of executable instructions that may be executed by the processor(s) 30. The storage device(s) 31 may further store one or more tables of locations of GEO satellites and/or parameters that may be used to calculate locations of non-GEO satellites. Processor(s) 30 may be further coupled to one or more user interface(s) 32, which may include one or more displays, buttons/keyboards, touchscreen(s), etc. A camera 22 may also be provided, as also shown in FIG. 2B. Processor(s) 30 may also be coupled to communication unit(s) 33, which may be coupled to one or more antennas 34. The communication units may include one or more wireless communication units, which may include units for cellular communications, Wi-Fi communications, Bluetooth® communications, satellite communications, near-field communications (NFC), etc., and may also incorporate communication units for "hard-wired" communications. The antennas 34 may include one or more antennas as may be appropriate for transmission and reception of the various signals corresponding to the various communication units 33. Antenna(s) 34 may be incorporated into device 20, directly attached to device 20, and/or may be disposed separately from device 20 and coupled to device 20, e.g., via a wire or other coupling. Device 20 may also incorporate one or more sensors 35. Such sensors 35 may include position and/or movement sensors, such as a compass and/or one or more gyroscopes; however, these are non-limiting examples. Additionally, directional sensors such as, but not limited to, compass, tilt and elevation sensors, or the like, may be included. Device 20 may further incorporate an offset generator 36, as will be discussed in further detail below.

Figure 4A:
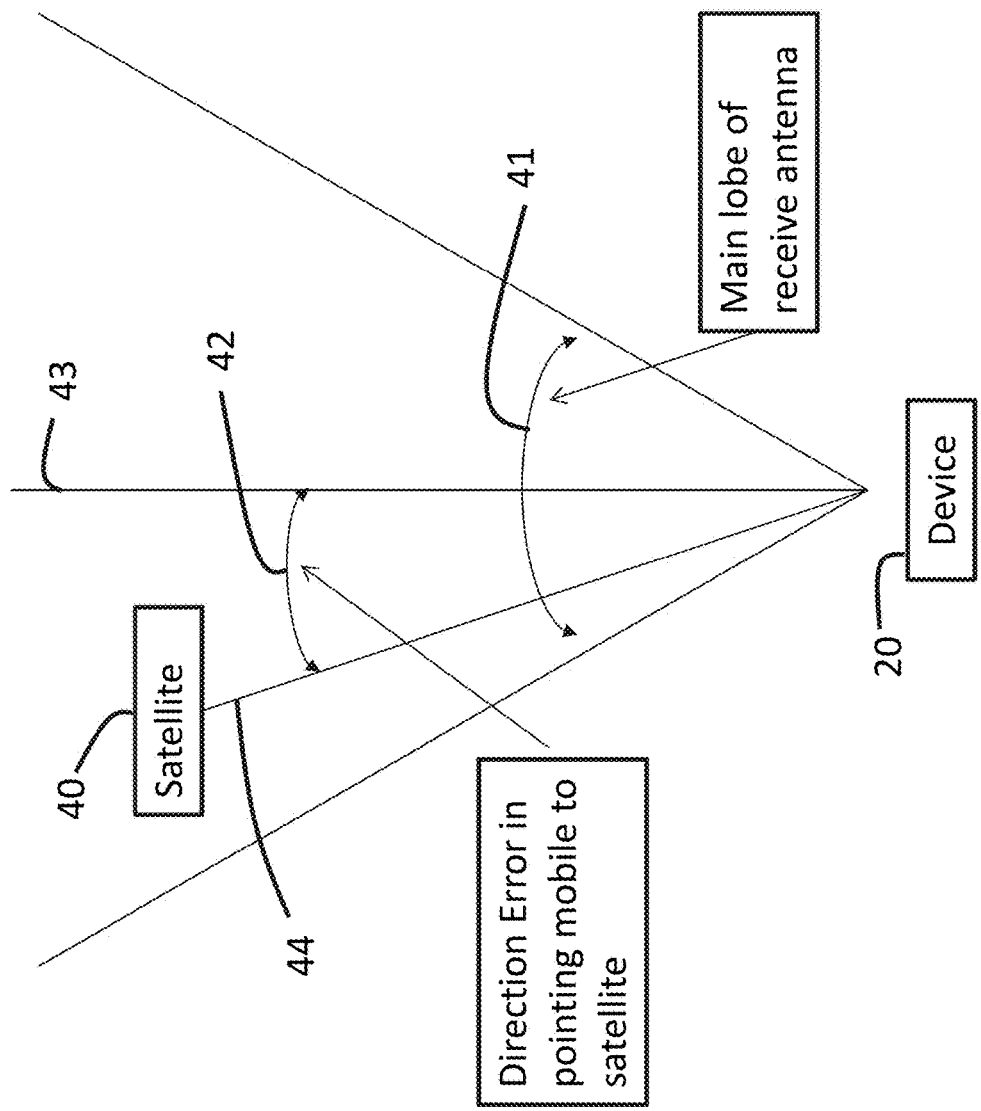
FIGS. 4A and 4B show, respectively, top and line-of-sight conceptual views from a device, according to various aspects of the present disclosure.

When using an AR antenna pointing application, as shown, e.g., in FIG. 1, the AR application may need to rely on outputs of the sensors 35 to calculate positions of the various satellites and to determine positions on the display of the satellite icons 11 of the various satellites. However, the sensors 35 may be of limited accuracy. In particular, as shown in FIG. 4A, the device 20 may determine, based on satellite position information or satellite position-related parameters, which, again, may be stored in storage device(s) 31 or received via communication units 33, that the direction towards the intended satellite 40 is the direction indicated by 44. However, due to error in the sensor 35 outputs (e.g., but not limited to, a compass or other direction-determining arrangement and/or one or more elevation sensors), the user may be guided (e.g., via placement of a corresponding satellite icon 11) to point the antenna of mobile device 20 in direction 43, i.e., with antenna main lobe 41 pointing in direction 43. In reality, however, the direction in which to point the antenna 34 for best reception may be indicated by direction 44, resulting in a pointing direction error 42 (i.e., an angular distance (which may be a distance in azimuth, elevation, or both) between the optimum direction 44 and the direction 43 in which the antenna 34 is pointing). In the case shown in FIGS. 4A and 4B, this may still facilitate signal reception from satellite 40 if the antenna 34 has a sufficiently wide main lobe 41. However, a widebeam antenna (i.e., one having a wide main lobe) may have a lower effective isotropic radiated power (EIRP) and, as such, may not provide as much gain as a narrowbeam antenna (i.e., one having a significantly narrower main lobe).

Figure 4B:
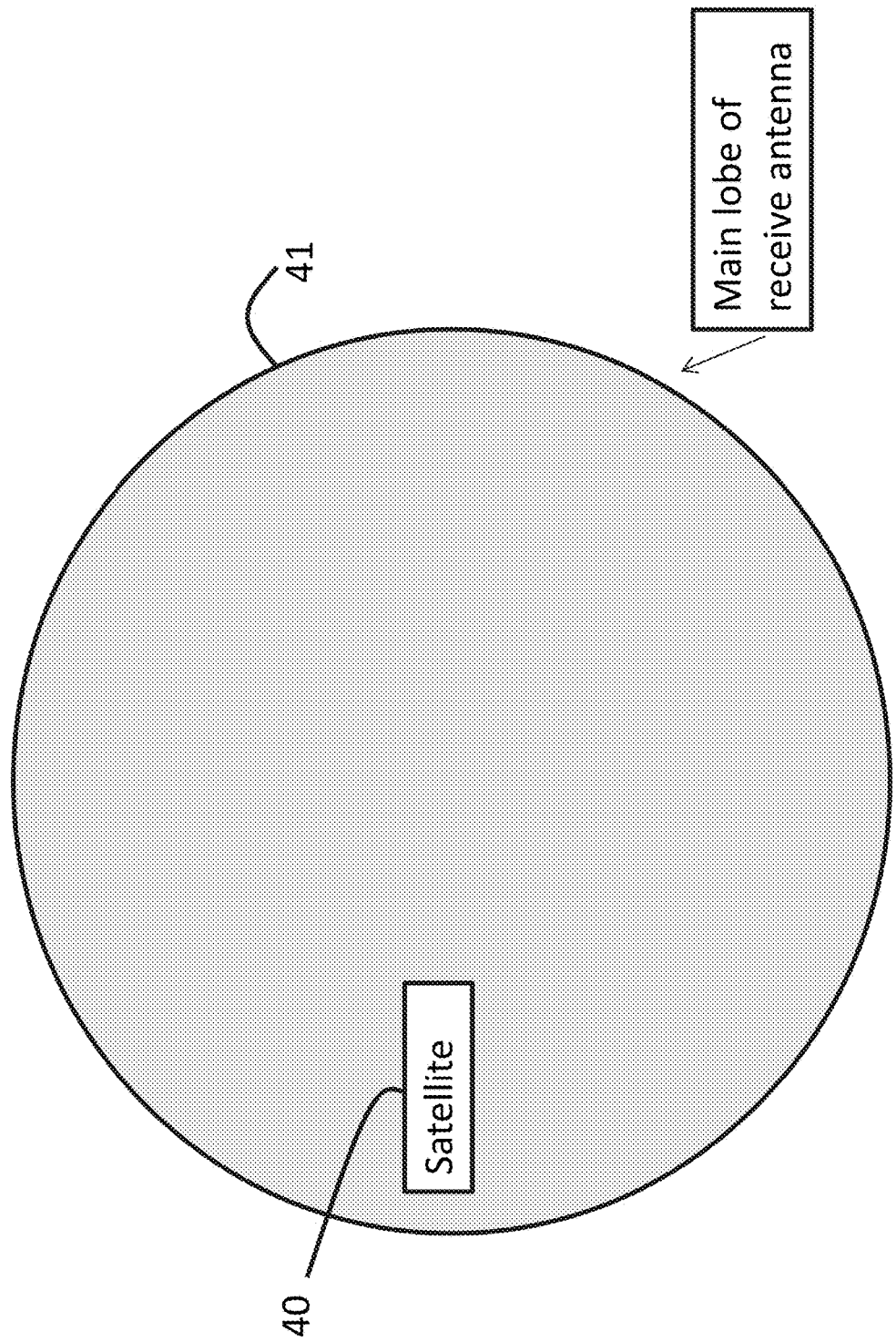
Figure 5A:
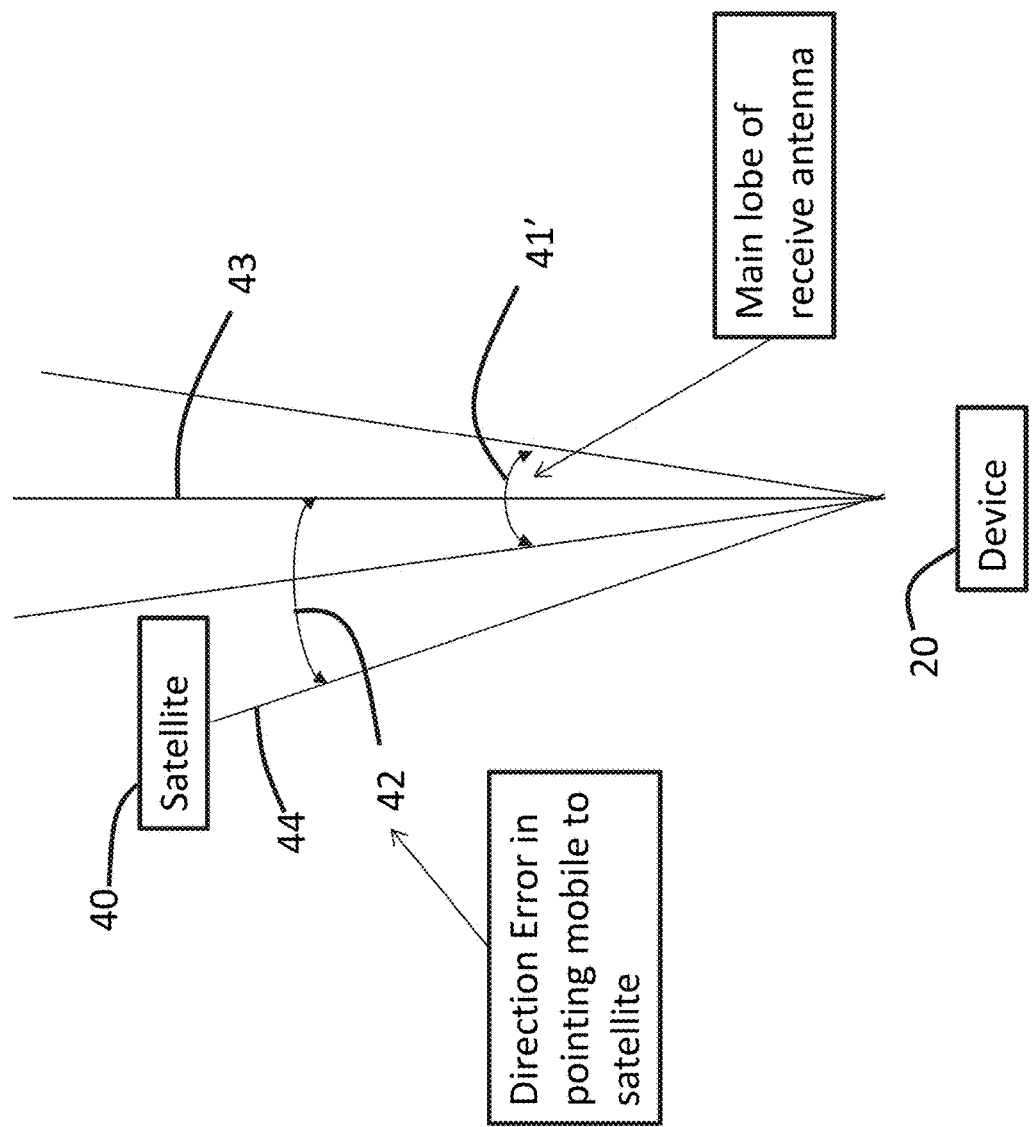
FIGS. 5A and 5B show, respectively, top and line-of-sight conceptual views from a device, according to various aspects of the present disclosure.
Figure 5B:
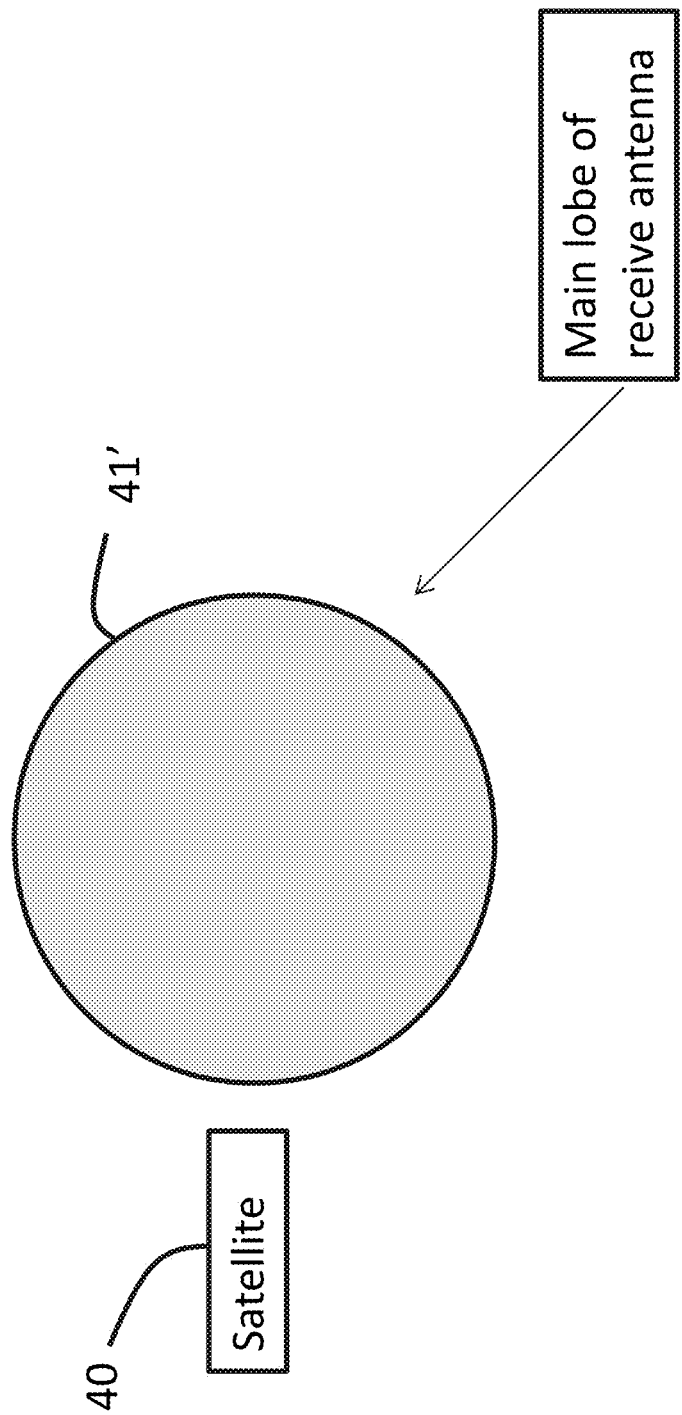

A case of a device 20 with a narrowbeam antenna (i.e., one with a main lobe that is significantly narrower than that of the antenna main lobe shown in FIGS. 4A and 4B) is shown in FIGS. 5A and 5B. In FIG. 5A, again, e.g., due to errors introduced by sensor 35 outputs, as discussed above, the antenna 34 is again pointed in direction 43. However, using the same sensor technology as in the example of FIGS. 4A and 4B, but with a narrowbeam antenna, the pointing direction error 42 may be the same as in FIG. 4A. However, the main lobe width 41' of the receive antenna 34 may, in FIGS. 5A and 5B be narrower. With such a narrower main lobe width, the satellite 40 may lie outside of the main lobe of the antenna 34, and, as such, the mobile device 20 may not receive sufficient signal energy from the satellite, and therefore, mobile device 20 may not be able to acquire the satellite 40 and establish a communication link. Therefore, a problem that may be addressed is how to acquire a satellite using a narrowbeam antenna, or in other words, to point the antenna 34 of the mobile device 20 so as receive sufficient signal power from satellite 40 so that the received signal is above some predetermined sensitivity threshold, where the antenna 34 is a narrowbeam antenna. One way to address this problem may be to effectively implement a wide beamwidth (e.g., 41 in FIGS. 4A, 4B) when using a narrowbeam antenna (i.e., one with a significantly narrower beamwidth, e.g., 41' in FIGS. 5A, 5B).

Figure 6A:
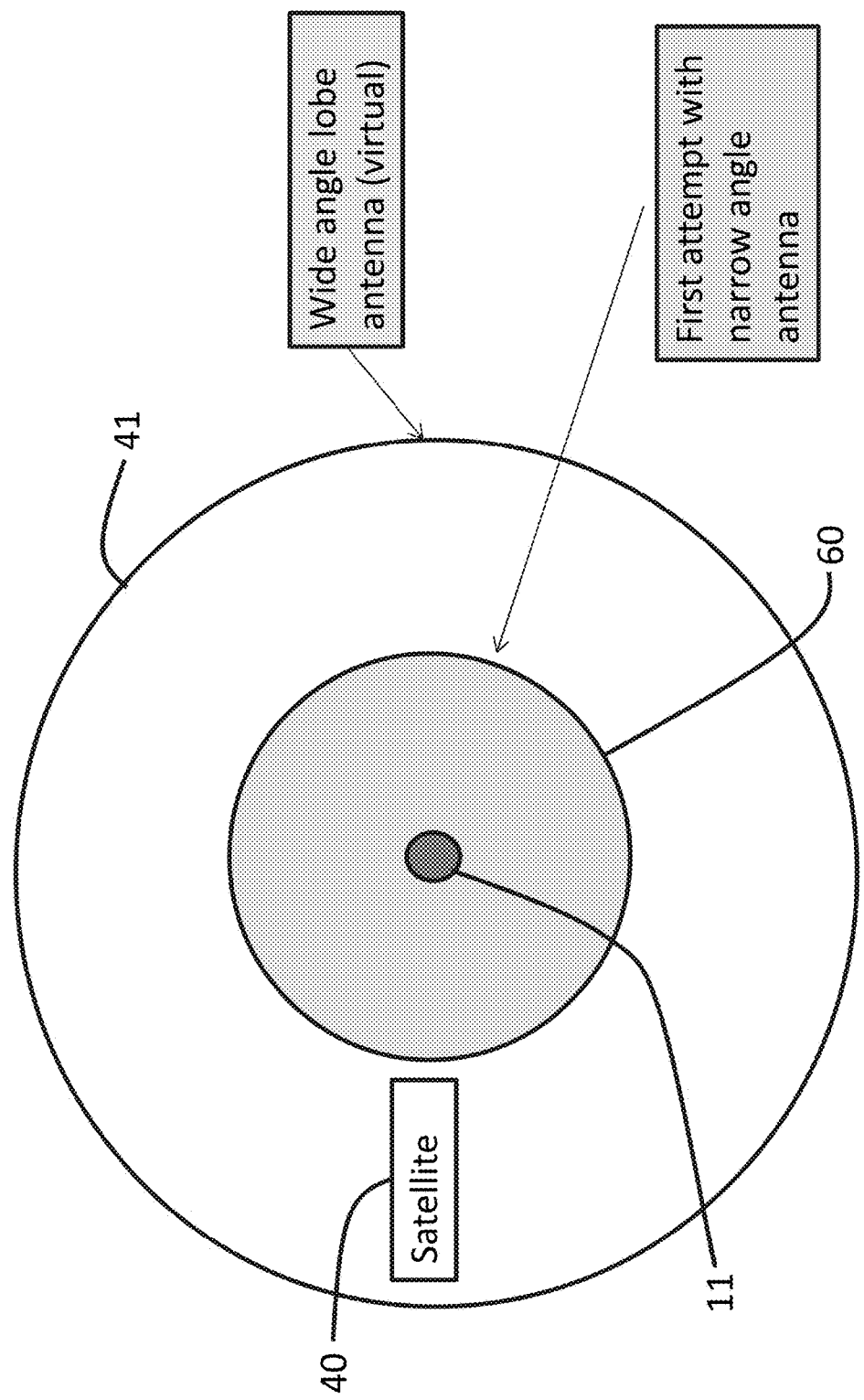

FIG. 6A shows an example of this basic problem. A widebeam antenna main lobe coverage area 41 is shown for purposes of reference but does not actually exist in this case. However, as shown in FIG. 4B, the satellite 40 may fall within the (virtual) coverage area 41, but if a narrowbeam antenna's main lobe 60 is initially pointed at the same direction 43 (e.g., as a result of a user pointing the mobile device 20 so as to align the device icon 13 with the satellite icon 11) as the widebeam antenna main lobe 41, the satellite may not fall within the main lobe of the narrowbeam antenna main lobe 60.

To address this, according to an aspect of the present disclosure, an offset generator 36 may be employed in device 20, as shown in FIG. 3. Offset generator 36 may be embodied, e.g., as a separate hardware component (e.g., programmed processor, field-programmable gate array (FPGA), etc.) or as software, in the form of executable instructions that may be executed by processor(s), which software may or may not be incorporated as part of the AR satellite acquisition application. Offset generator 36 may operate to offset the position, in display 10, of satellite icon 11 corresponding to the desired satellite 40. This may be an offset in azimuth and/or elevation. This may initially be done, e.g., by the AR-based satellite acquisition application, and may be based on information from sensor(s) 35, GPS information about the position of the device 20, etc., and it may be done in a number of ways. According to one non-limiting example, the offset generator 36 may provide an offset to the directional information obtained from the sensors 35, which may then be fed to the AR-based satellite acquisition application to offset the displayed position of at least the applicable satellite icon 11 (it is possible that all satellite icons 11, or any subset thereof, may be offset). According to another non-limiting example, offset generator 36 may provide an offset to the output of the AR application or within the AR application. According to a further non-limiting example, the offset generator 36 may modify the expected position of one or more of the satellites. In accordance with yet a further non-limiting example, the offset may modify the calculated direction towards the intended satellite 40. Regardless of the specific method used, the offset generator 36 may inject an offset that may result in a re-positioning of the AR-generated satellite icon(s) 11 on the display 21. The user may then move the mobile device 20, e.g., by pivoting the mobile device 20, to point the mobile device 20 toward the satellite icon 11 of desired satellite 40, e.g., by pointing device 20 such that device icon 13 is placed on the satellite icon 11 of desired satellite 40, so that the device/antenna may point toward the offset position of satellite icon 11. An example of this is shown in FIG. 6B.

Figure 6B:
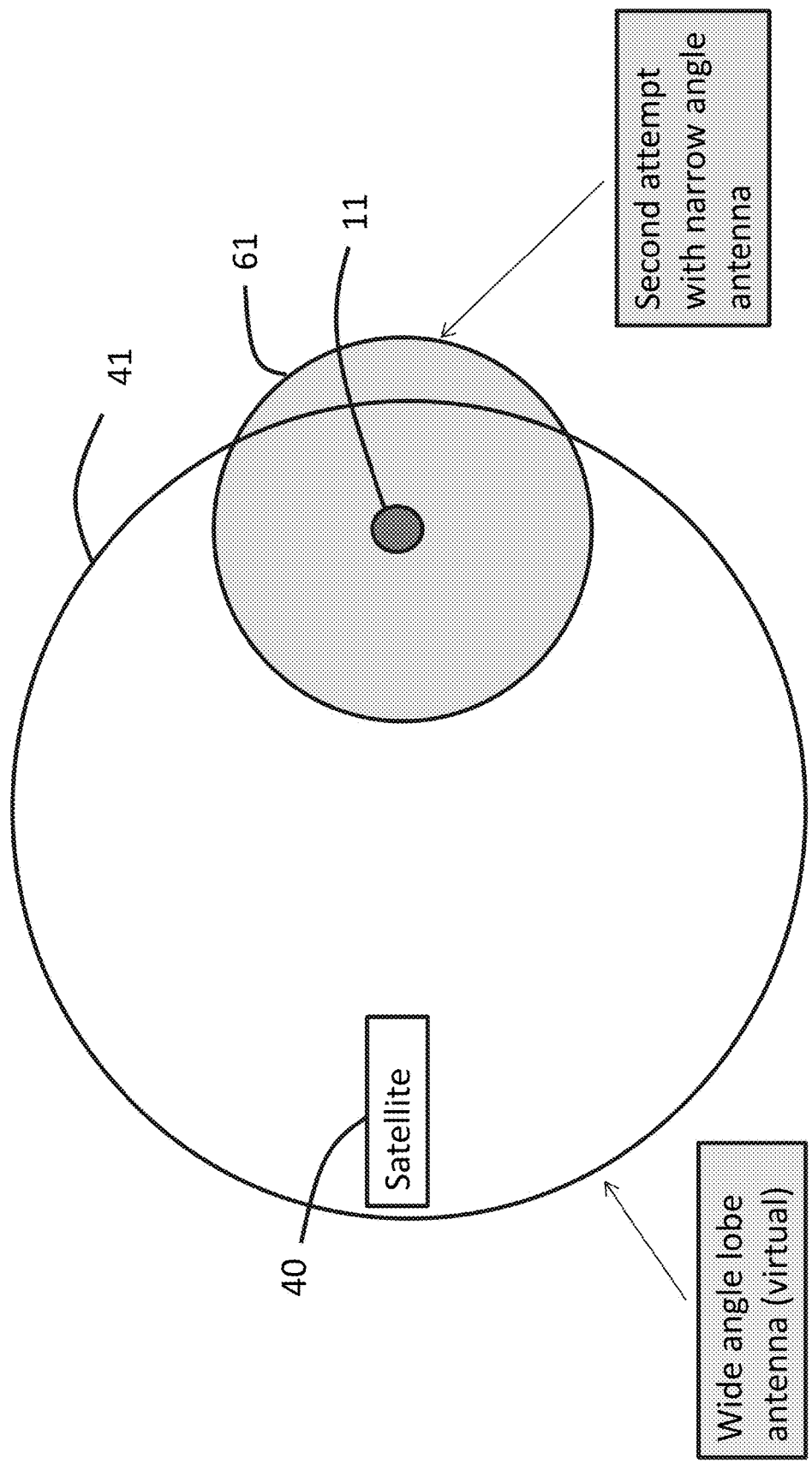
Figure 6C:
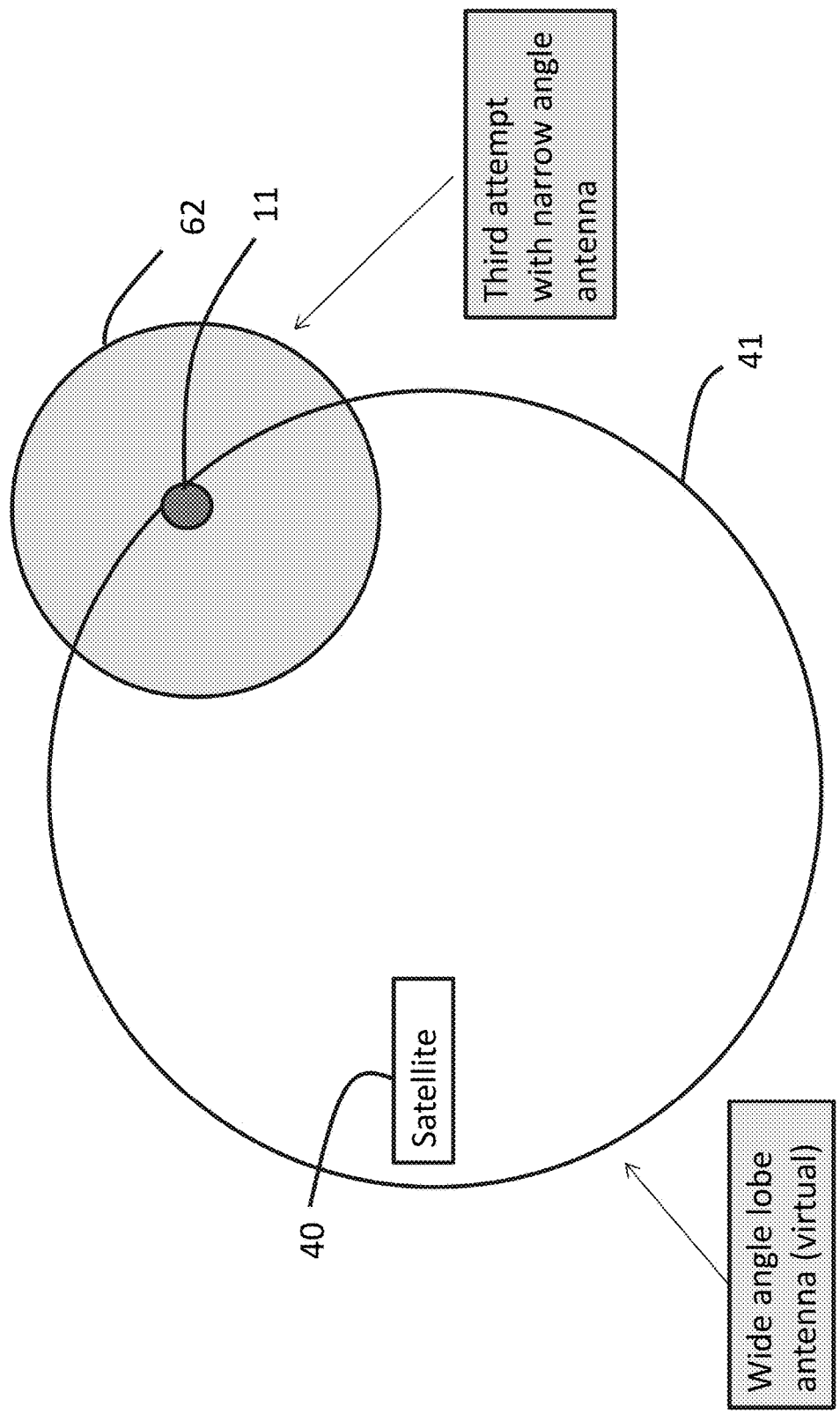
Figure 6E:
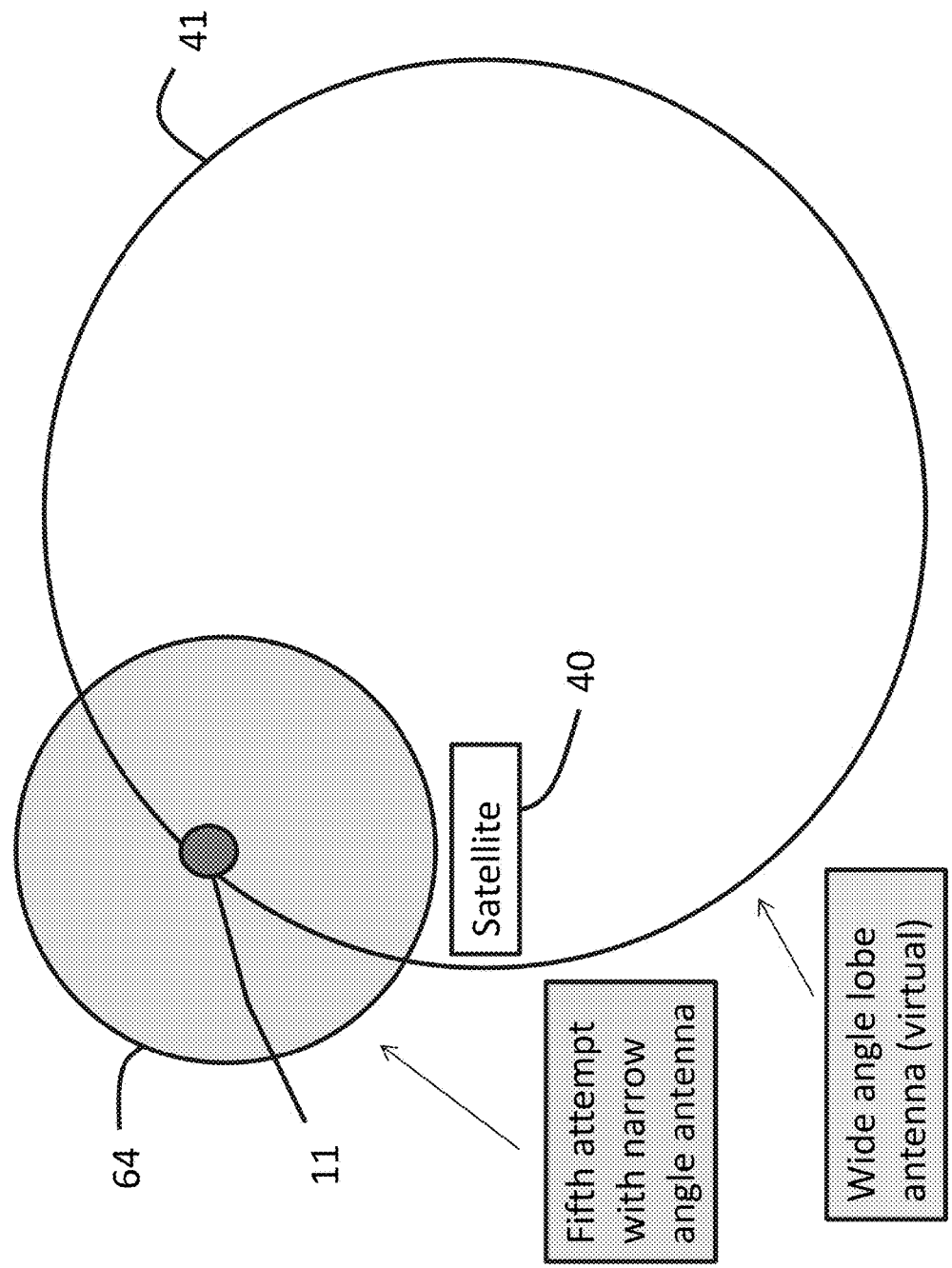
Figure 6F:
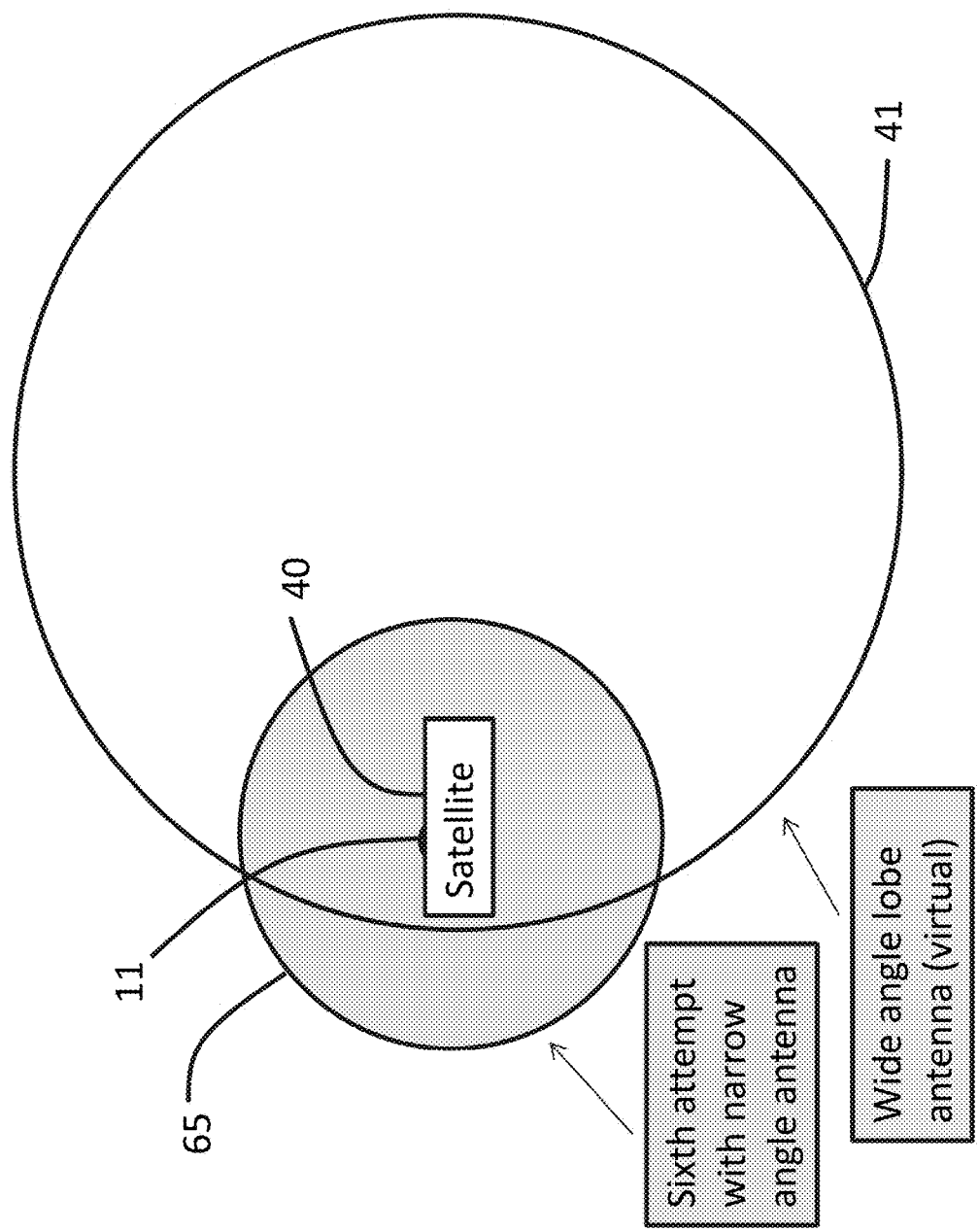

In the example of FIG. 6B, the narrowbeam antenna main lobe 61, after a first offset and re-pointing by the user, may still not point toward the satellite 40. That is, the first offset may be in an incorrect direction, and as a result, the satellite 40 may still not be acquired. As in FIGS. 6C-6F, further offsets may be generated and applied, to move the position of the AR-generated satellite icon 11 on display 21, until the device 20 is able to acquire the satellite 40.

Figure 6G:
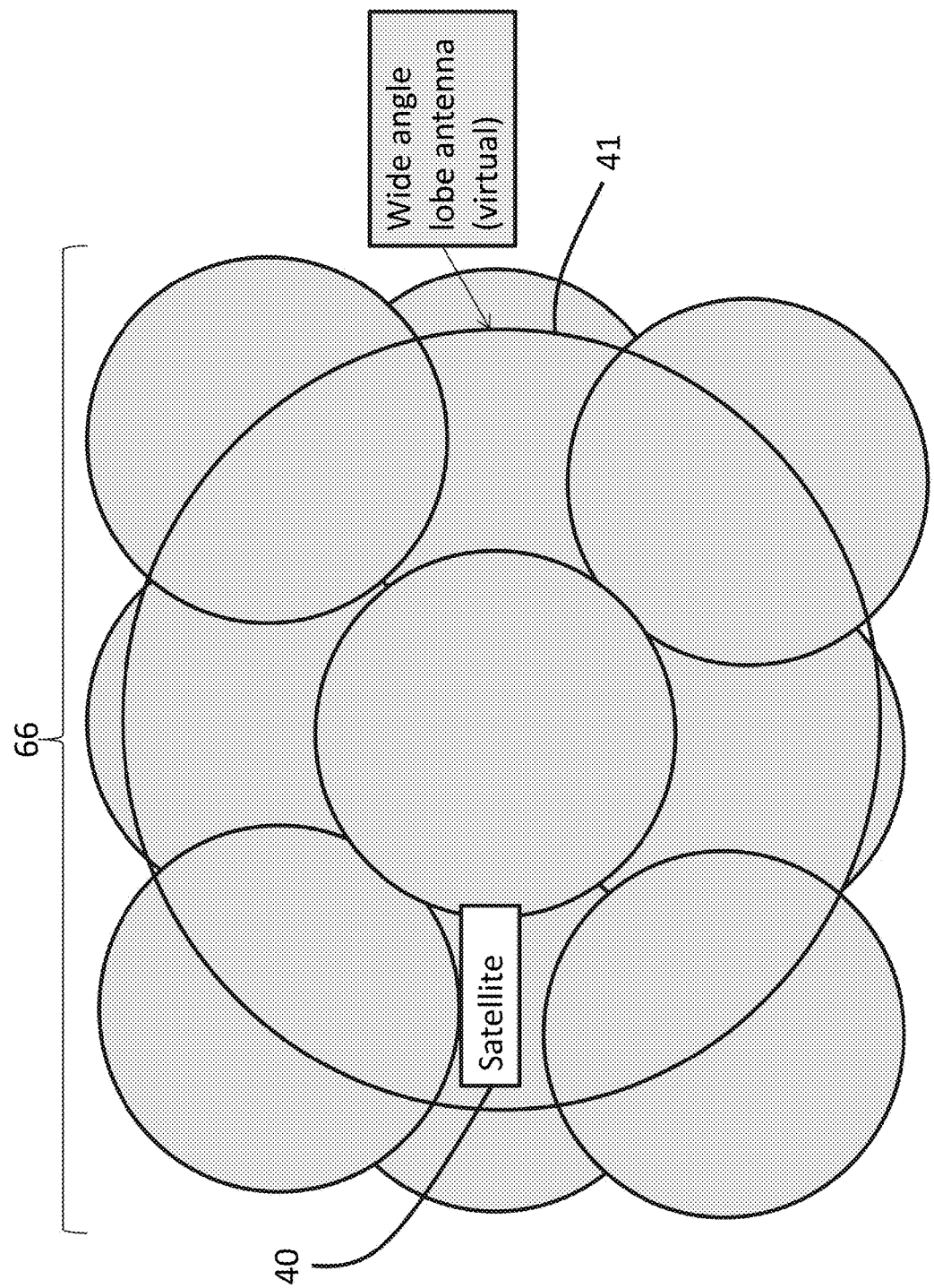

Put in different terms, using offset generator 36, the AR application may sequentially guide the user to modify the direction in which the antenna of mobile device 20 points, thus consequently generating the equivalent of a wider antenna pattern main lobe 41 by perturbing the position of the satellite icon 11 corresponding to desired satellite 40 on display 21 of mobile device 20. An example of this is shown in FIG. 6G.

It should be noted that the examples of FIGS. 6A-6G are not limiting. Different orders of perturbation and/or different coverage patterns may be generated. In general, a series of offsets may be generated according to some predetermined pattern, which may be based on a desired effective coverage area. In fact, the predetermined pattern may even cover areas greater than that of the hypothetical wide main lobe 41 shown in FIGS. 6A-6G.

Figure 7A:
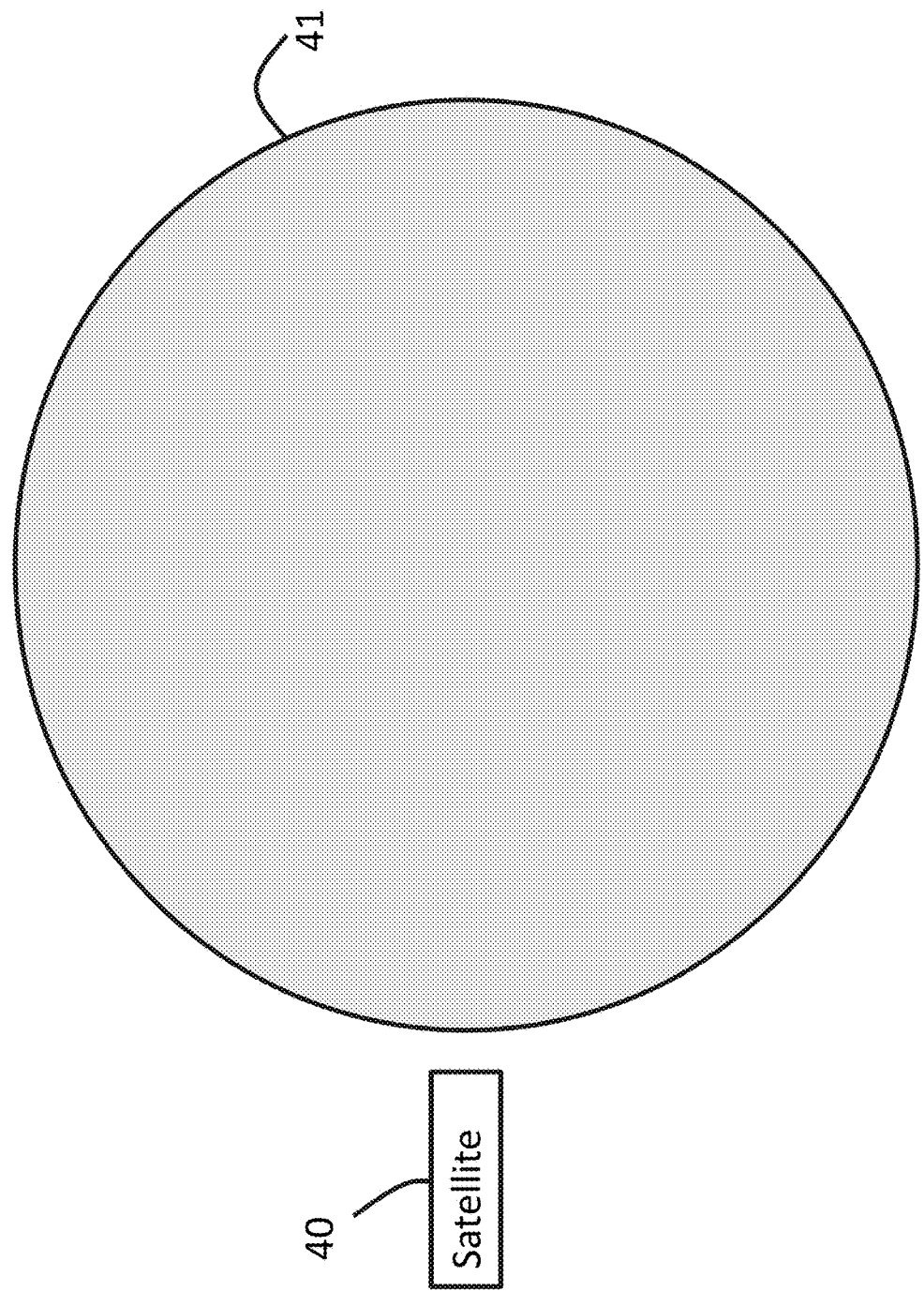
FIGS. 7A and 7B show further line-of-sight conceptual views from a device, according to various aspects of the present disclosure.
Figure 7B:
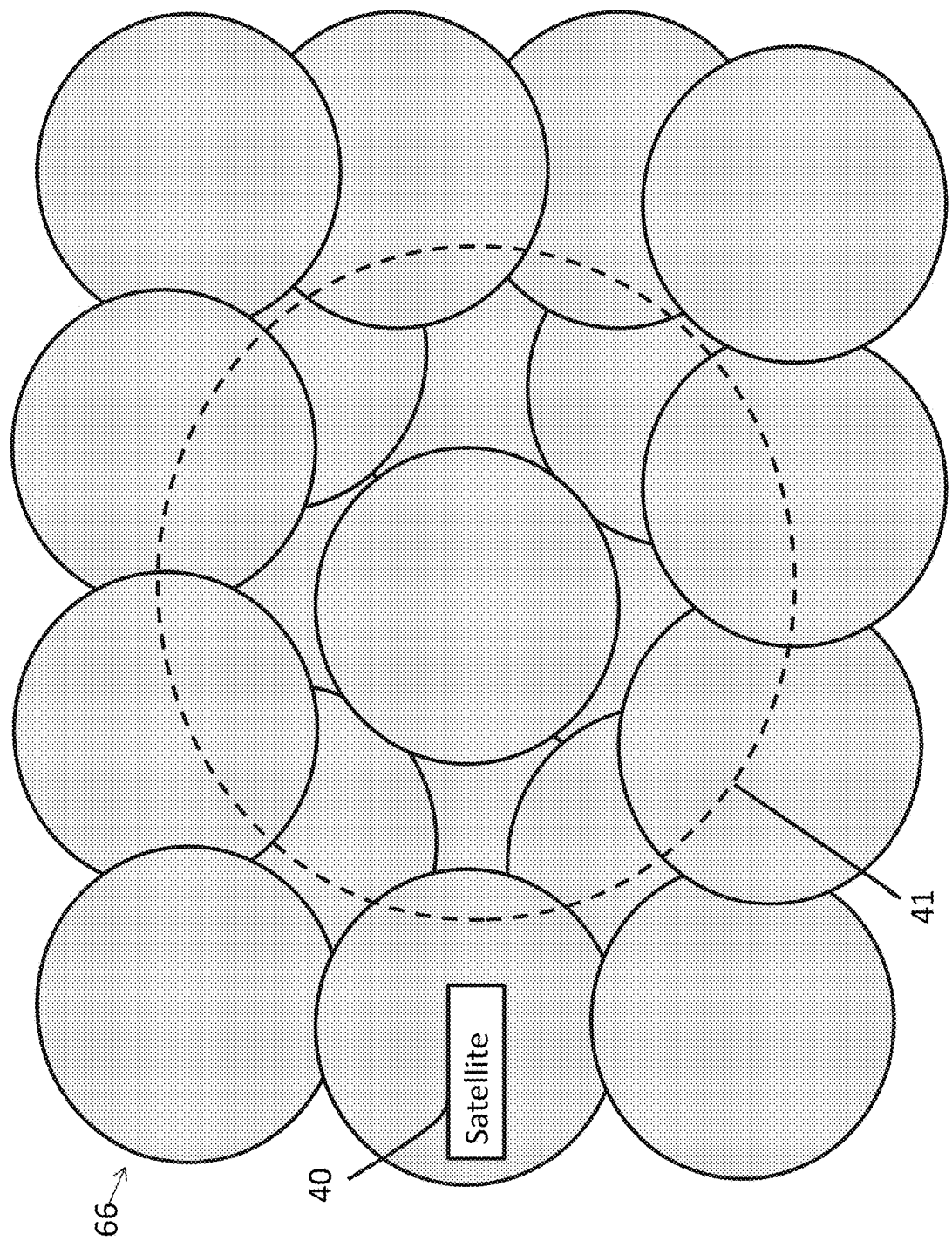

For example, it may be the case that, e.g., due to sensor 35 inaccuracies, the expected position shown on display 21 may lead the user to point device 20 such that, even if an antenna 34 of device 20 were to have the hypothetical wide main lobe 41, satellite 40 would still lie outside the hypothetical wide main lobe 41, as shown in the example of FIG. 7A. In such a case, an offset pattern that covers only (approximately) the wide main lobe 41, as in FIG. 6G, may not suffice to permit acquisition of satellite 40. Therefore, offset generator 36 may be enabled to generate further offsets, beyond those shown in FIG. 6G, such that an even wider area is effectively covered, as shown in the example of FIG. 7B. In fact, the number of different offsets that may be generated, and the effective pattern formed by the narrow main lobe, may be any number or pattern, as may be designed into offset generator 36 by the designer or otherwise set by a user (e.g., the device 20 may offer the user a menu that may allow the user to elect a particular pattern and/or number of offsets to be executed, and/or a choice may be offered to the user to elect to increase the size of the pattern/number of offsets, if the satellite 40 is not acquired after an initial set of offsets have been introduced and acquisition attempts made).

Many variations of these offsetting techniques are possible and fall within the scope of this disclosure. For example, the offsets may be relative to a particular direction, e.g., the direction that is initially calculated as the direction to the intended satellite 40 (i.e., where the satellite icon 11 corresponding to intended satellite 40 is initially placed on display 21 of mobile device 20), based on the outputs of sensors 35, or may be relative to a previous offset. While the offsets may be predetermined, they may be chosen randomly, rather than according to a particular order. Additionally, while the pattern emulated by the offsets has been shown and described as being circular, it may be of any shape or size and need not necessarily emulate any particular widebeam antenna main lobe shape or size. Also, in accordance with a further aspect of this disclosure, the shape of the virtual/emulated lobe 66 may be proportional to the relative accuracy of the azimuth and/or elevation information reflected by the outputs of sensors 35. Furthermore, as noted above, once a particular widebeam antenna main lobe has been emulated, if the satellite has still not been acquired, further offsets, covering areas outside of the initial set of offsets that emulate the widebeam antenna main lobe, may be applied.

Figure 8A:
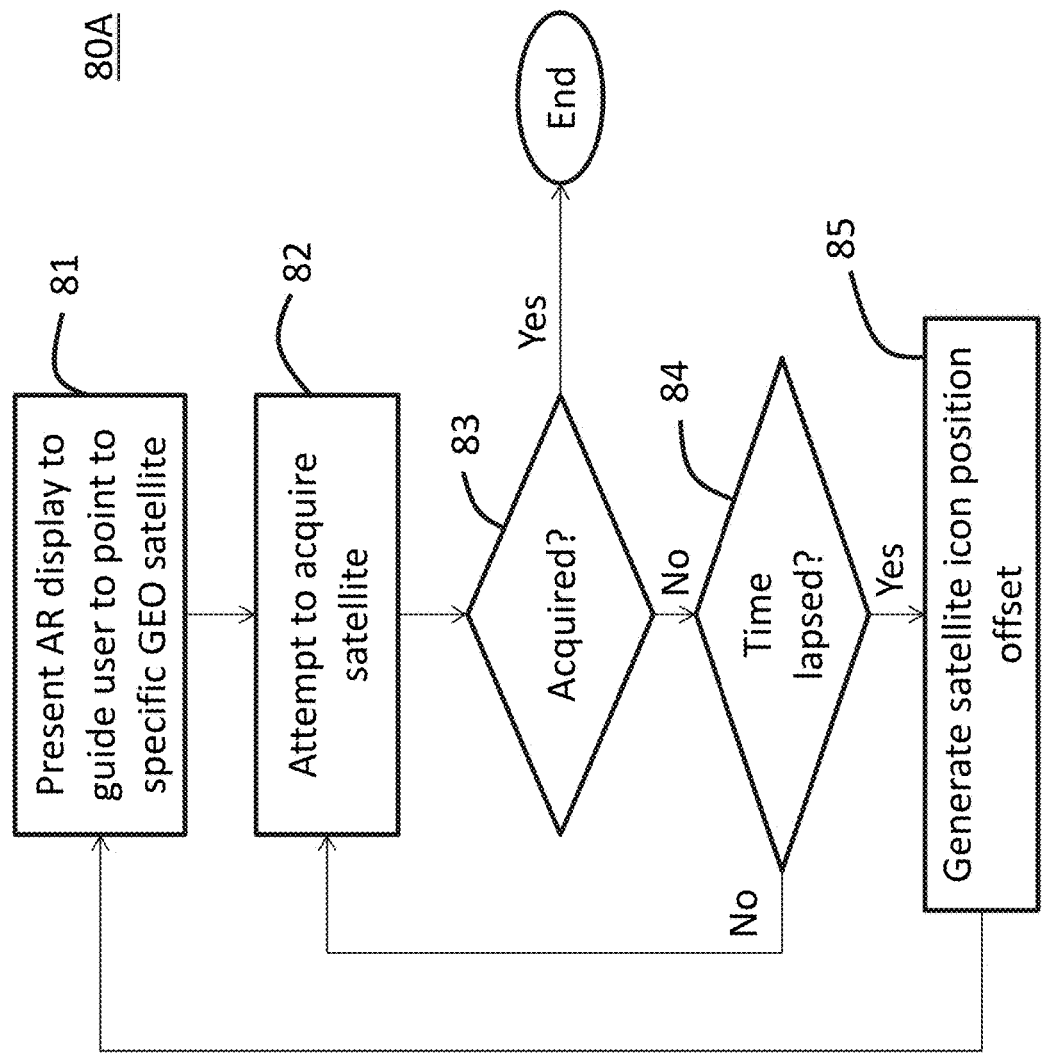
FIGS. 8A-8C show various conceptual flow diagrams according to various aspects of the present disclosure.
Figure 8B:
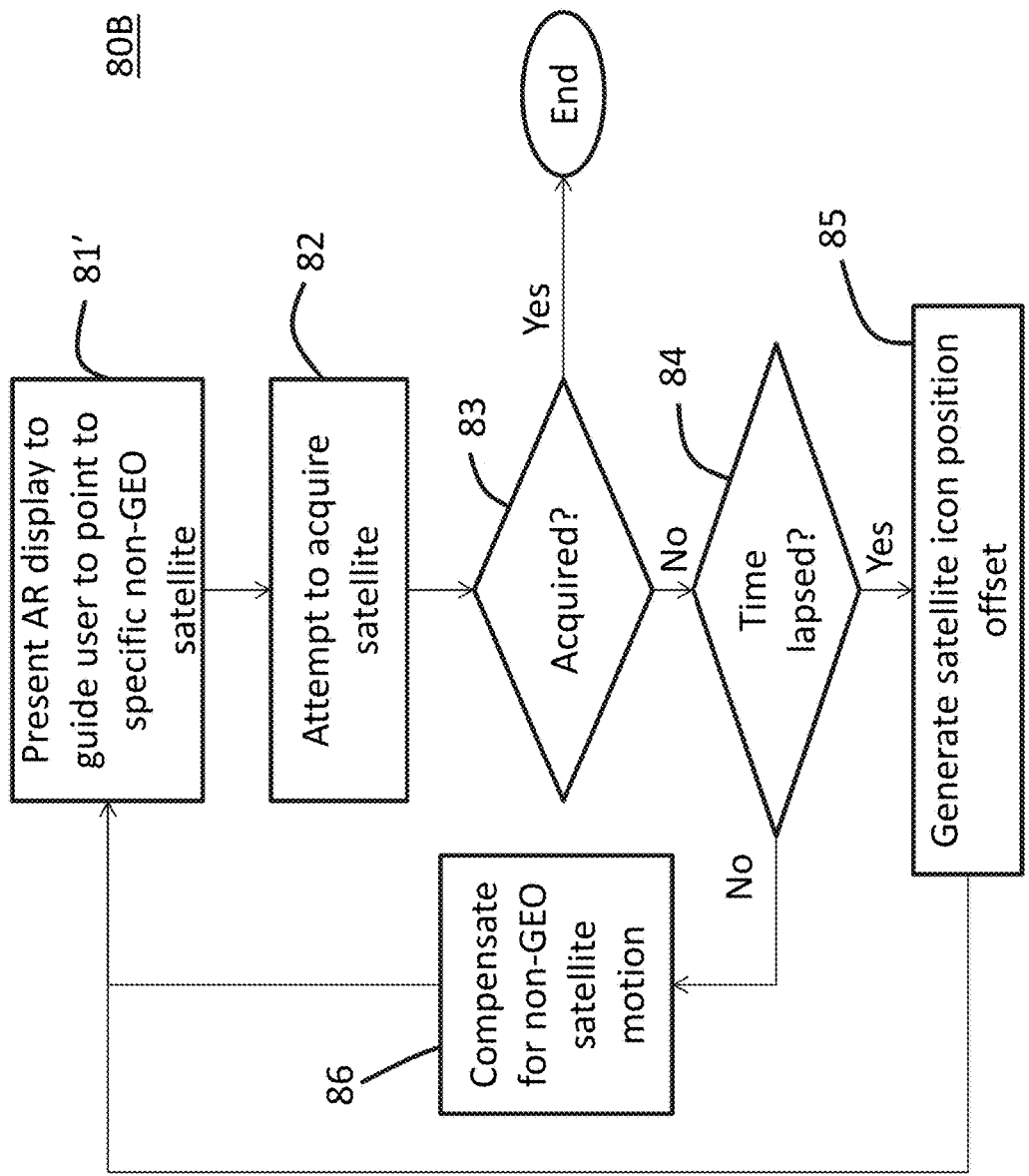
Figure 8C:
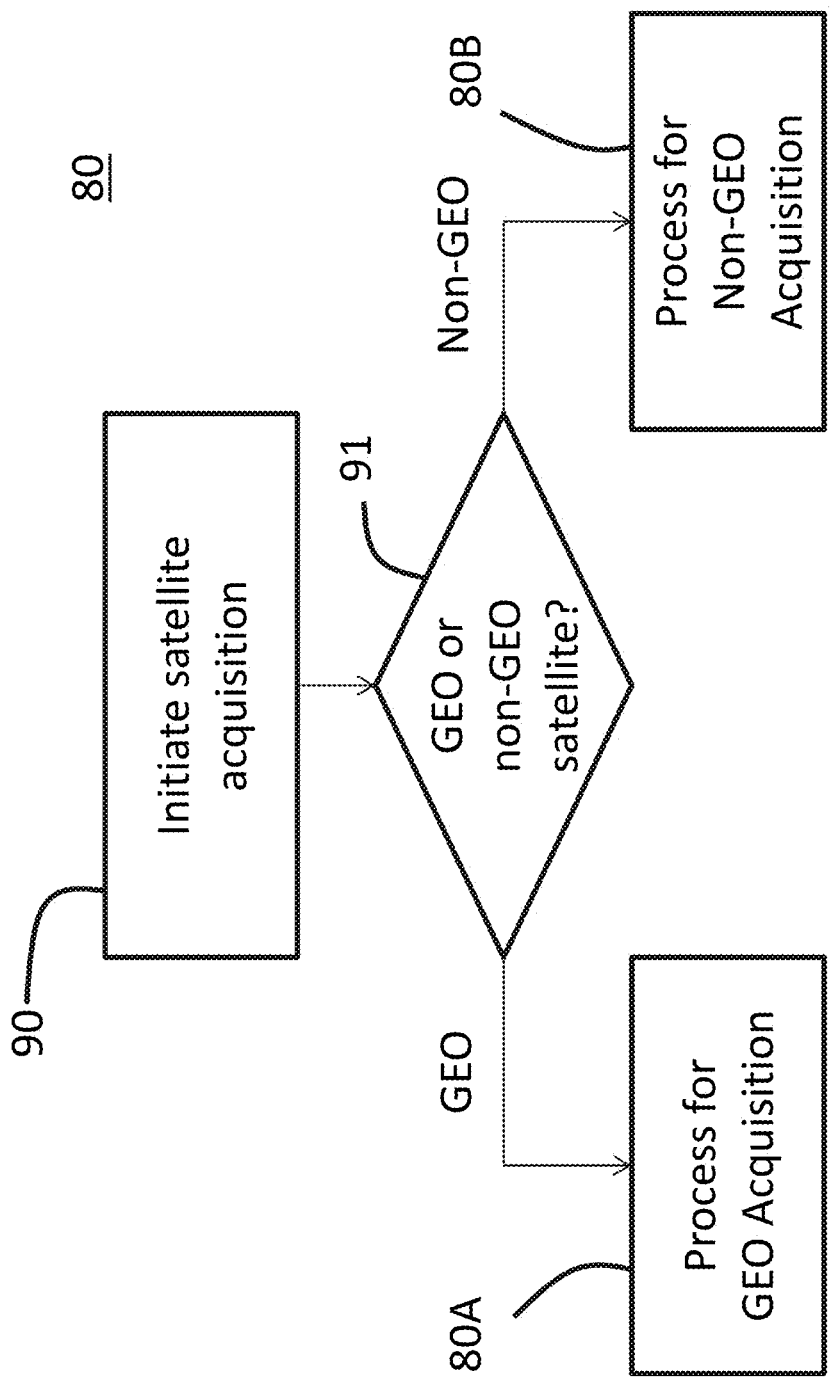

FIGS. 8A-8C show various conceptual flowcharts that may incorporate aspects of the present disclosure. FIG. 8A may be used in the case of attempting to acquire a GEO satellite. In particular, in process 80A, an AR display may be presented 81 to a user to guide the user to point the user's device 20, or an antenna 34 associated therewith, toward a particular GEO satellite, which may be selected by the user. An attempt 82 may then be made to acquire the satellite. If the satellite is acquired 83, the process ends. If not, a determination may be made as to whether or not a predetermined time period has lapsed 84. If no, the process may loop back to block 82, to allow sufficient time for the mobile device 20 to acquire the satellite or to make a further attempt, and this sub-process may iterate until either the time period has lapsed or until the satellite is acquired. If the time period lapses, an offset may be generated 85 to adjust the position of the satellite icon in the AR display, e.g., using offset generator 36, and process 80A may loop back to present the offset position of the satellite icon 11 in the AR display, in block 81, thus guiding the user to point the device 20/antenna 34 at the (offset) satellite icon 11 position. Process 80A may iterate until the satellite is acquired or until the user elects to halt the process; the user may be advised, e.g., by the AR application to halt the process and may elect to halt it in response thereto.

FIG. 8B shows a process 80B that may be used to attempt to acquire a non-GEO satellite. Process 80B may begin by presenting an AR display to the user 81', again, to guide the user to point the user's device 20 or an associated antenna 34 toward a particular non-GEO satellite selected by the user. It should be noted that, while block 81 of FIG. 8A may use static tables to calculate a position of a GEO satellite, block 81' of FIG. 8B may use orbital parameters of the non-GEO satellite, along with the specific time, to calculate a position of the non-GEO satellite. An attempt 82 may then be made to acquire the desired satellite. If the attempt is determined 83 to have been successful, the process ends. If not, then a determination is made 84 as to whether or not a predetermined time period has lapsed. If the time period has not yet lapsed, the process 80B may compensate for non-GEO satellite motion 86 and return to block 81' to re-present the AR display with the position of the satellite icon 11 representing the non-GEO satellite compensated for motion (and the user may then continuously (in the sense of as the satellite icon 11 is repositioned in display 21) move the device 20 so as to keep the device icon 13 on the satellite icon 11, consequently re-pointing the device 20 and/or antenna 34). Otherwise, if the time period has lapsed, process 80B may generate 85 a satellite icon 11 position offset, and this offset may be applied in block 81' to revise position of the satellite icon 11 displayed to the user. Process 80B may iterate until the satellite is acquired or until the user elects to halt the process (which, as noted above in connection with FIG. 8A, may be in response to being advised to halt the process). It is noted that the motion compensation 86 may continuously (or at regular intervals) re-position the non-GEO satellite icon 11 relative to its previous position in the display, while the offset generated 85 may re-position the satellite icon 11 relative to its initial position in the display, its last motion-compensated position in the display, or in any other way, e.g., as described in general above (e.g., predetermined pattern, random pattern of application of offsets around initial position, etc.).

FIG. 8C shows an overall process 80 that may be used to acquire a GEO satellite or a non-GEO satellite. Process 80 may begin with an initialization 90. It may then determine 91 if the user desires to acquire a GEO satellite or a non-GEO satellite; this may be determined by receiving user input of a desired satellite name, by detecting a satellite to which the user initially points the device 20/antenna 34, etc. The process 80 may be implemented in the device 20 and may access information stored in the device in determining 91 whether the desired satellite, however indicated/selected by the user, is a GEO satellite or a non-GEO satellite. If determining 91 results in the desired satellite being found to be a GEO satellite, the process 80 may proceed to block 80A, which may incorporate process 80A of FIG. 8A. If determining 91 results in the desired satellite being found to be a non-GEO satellite, the process 80 may proceed to block 80B, which may incorporate process 80B of FIG. 8B. After this, the selected process 80A, 80B may proceed as described above.

In some variations on the above techniques, the AR process that may be implemented in device 20 may, after a satellite is acquired, note a difference in direction between a final position at which the satellite is acquired and the initial direction in which it was believed that the satellite was positioned, based on the output(s) obtained from sensor(s) 35. This difference in direction may be used to compensate for inaccuracies in sensor(s) 35 and/or to modify a sequence of offsets generated by offset generator 36. The direction difference may be used as it is generated, on a one-time basis, or it may be stored and/or averaged over some number of instances.

Furthermore, according to further aspects of the present disclosure, if the device 20 loses its communication link with satellite 40, the process of acquisition, using the AR-enhanced display, may begin from the last-known direction to the satellite 40. For a GEO satellite, this may be the direction at which the satellite 40 was acquired. For a non-GEO satellite, in which movement of the non-GEO satellite may be compensated for during acquisition (and may, in some variations, further be compensated for during communications), this may correspond to the last direction for which communications were successful (which may include compensation for anticipated satellite motion).

Those skilled in the art will recognize that there is a correlation between the terms, "position of the satellite" and "direction to the satellite." The position of the satellite in the sky, relative to the mobile device, may be determined based on the (GPS) position of the mobile device and either the known orbital location of a GEO satellite or the position of the mobile device, the time, and orbital parameters of a non-GEO satellite (using well-known equations). The position of the satellite in the sky, relative to the mobile device, corresponds to a direction to the satellite, e.g., in terms of azimuth and elevation. Therefore, offsetting a position of the satellite, relative to the mobile device, and offsetting a direction to the satellite from the mobile device may be considered equivalent operations. While various aspects of this disclosure may refer to one or the other, it would, therefore, be apparent to one skilled in the art that operations on one correspond to similar operations on the other.

Various operations described above may be performed by dedicated electronic hardware devices, or alternatively, may be implemented using other hardware, software, or firmware, or combinations thereof, including the possibility of using a processor that may execute software instructions, which may, e.g., be saved on a storage device, and which may cause the operations to be implemented.

Various aspects of the disclosure have been presented above. However, the invention is not intended to be limited to the specific aspects presented above, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A method of acquiring a communications satellite to support communications by a user device, the method including:

proceeding, beginning with an initial set of satellite positions in the sky, to iteratively perform one or more iterations of the following operations at the user device:
  providing an augmented-reality (AR) display, configured to superimpose positions of one or more satellites in the sky, relative to the user device, in the form of one or more satellite icons, on the display;
  in response to the user device or an antenna associated with the user device being pointed toward a given satellite, attempting to acquire the given satellite;
  if acquisition is successful, ending a present iteration and engaging in communications using the given satellite;
  if acquisition is unsuccessful and a predetermined time period has not yet lapsed, continuing said attempting to acquire the given satellite; and
  if acquisition is unsuccessful and the predetermined time period has lapsed without successful acquisition of the given satellite, generating an offset position of a satellite icon corresponding to the given satellite and using the offset position of the satellite icon to perform said providing an AR display.

2. The method of claim 1, wherein, if the given satellite is a non-geosynchronous earth orbit (non-GEO) satellite, further comprising compensating for movement of the non-GEO satellite by updating a position of the non-GEO satellite and performing said providing the AR display while continuing said attempting to acquire the given satellite.

3. The method of claim 2, wherein said generating the offset position of the satellite icon comprises generating a position of the satellite icon offset from a previous position of the satellite icon and compensated for movement of the non-GEO satellite.

4. The method of claim 1, wherein the initial set of satellite positions comprises at least one of: (a) satellite positions stored in the user device; or (b) satellite positions computed by the mobile device based on one or more satellite orbital parameters stored in the user device.

5. The method of claim 4, wherein the initial set of satellite positions also includes identifications of the satellites, and wherein the AR display includes identifications of the respective one or more satellites.

6. The method of claim 1, further comprising, following acquisition of the given satellite, computing a difference in direction between a direction at which the satellite is acquired and an initial calculated direction from the user device to the satellite, and using the difference to compensate for errors in one or more directional sensors of the user device for use in a future satellite acquisition.

7. The method of claim 6, further comprising averaging the difference over multiple satellite acquisitions, and using an averaged difference to compensate for said errors.

8. The method of claim 1, wherein said generating the offset position comprises generating a position offset of the satellite icon corresponding to the given satellite by a predetermined amount from the initial position of the satellite icon corresponding to the given satellite.

9. A non-transitory machine-readable medium containing executable instructions configured to cause a processor of a user device to perform operations including:
  beginning with an initial set of satellite positions in the sky, iteratively performing one or more iterations of the following procedures:
    providing an augmented-reality (AR) display, configured to superimpose positions of one or more satellites in the sky, relative to the user device, in the form of one or more satellite icons, on the display;
    in response to the user device or an antenna associated with the user device being pointed toward a given satellite, attempting to acquire the given satellite;
    if acquisition is successful, ending a present iteration and engaging in communications using the given satellite;
    if acquisition is unsuccessful and a predetermined time period has not yet lapsed, continuing said attempting to acquire the given satellite; and
    if acquisition is unsuccessful and the predetermined time period has lapsed without successful acquisition of the given satellite, generating an offset position of a satellite icon corresponding to the given satellite and using the offset position of the satellite icon to perform said providing an AR display.

10. The medium of claim 9, wherein, if the given satellite is a non-geosynchronous earth orbit (non-GEO) satellite, the procedures further include compensating for movement of the non-GEO satellite by updating a position of the non-GEO satellite and performing said providing the AR display while continuing said attempting to acquire the given satellite.

11. The medium of claim 10, wherein said generating the offset position comprises generating a position of the satellite icon offset by a predetermined amount from a previous position of the satellite icon, compensated for movement of the non-GEO satellite.

12. The medium of claim 1, wherein the initial set of satellite positions comprises at least one of: (a) satellite positions stored in the user device; or (b) satellite positions computed by the mobile device based on one or more satellite orbital parameters stored in the user device.

13. The medium of claim 12, wherein the initial set of satellite positions also includes identifications of the satellites, and wherein the AR display includes identifications of the respective one or more satellites.

14. The medium of claim 9, the operations further including, following acquisition of the given satellite, computing a difference in direction between a direction at which the satellite is acquired and an initial calculated direction from the user device to the satellite, and using the difference to compensate for errors in one or more directional sensors of the user device for use in a future satellite acquisition.

15. The medium of claim 14, the operations further including averaging the difference over multiple satellite acquisitions, and using an averaged difference to compensate for said errors.

16. The medium of claim 9, wherein said generating the offset position comprises generating a position offset of the satellite icon corresponding to the given satellite by a predetermined amount from the initial position of the satellite icon corresponding to the given satellite.

17. A user device configured to communicate with at least one satellite, the user device including:
  one or more processors; and
  the machine-readable medium of claim 9, communicatively coupled to the one or more processors.

18. The user device of claim 17, further including at least one camera communicatively coupled to the one or more processors and configured to provide at least one image to be used in providing the augmented-reality (AR) display.

19. The user device of claim 17, further comprising one or more wireless communication units, communicatively coupled to the one or more processors, and at least one antenna coupled to at least one of the one or more wireless communication units, wherein the at least one of the one or more wireless communication units is a satellite communications transmitter, a satellite communications receiver, or a satellite communications transceiver.

20. The user device of claim 17, further comprising an offset generator configured to generate the offset position of the satellite icon on the display, corresponding to the given satellite, the offset generator being communicatively coupled to the one or more processors.

* * * * *